United States Patent
She et al.

(10) Patent No.: US 11,769,232 B2
(45) Date of Patent: Sep. 26, 2023

(54) MACHINE LEARNING TECHNIQUES FOR IDENTIFYING CLOUDS AND CLOUD SHADOWS IN SATELLITE IMAGERY

(71) Applicant: Climate LLC, Saint Louis, MO (US)

(72) Inventors: Ying She, Union City, CA (US);
Pramithus Khadka, Ofallon, MO (US);
Wei Guan, Pleasanton, CA (US);
Xiaoyuan Yang, Pleasanton, CA (US);
Demir Devecigil, St. Charles, MO (US)

(73) Assignee: CLIMATE LLC, Saint Louis, MO (US)

( * ) Notice: Subject to any disclaimer, the term of this patent is extended or adjusted under 35 U.S.C. 154(b) by 0 days.

(21) Appl. No.: 17/676,018

(22) Filed: Feb. 18, 2022

(65) Prior Publication Data
US 2022/0237911 A1 Jul. 28, 2022

Related U.S. Application Data

(63) Continuation of application No. 16/657,957, filed on Oct. 18, 2019, now Pat. No. 11,256,916.
(Continued)

(51) Int. Cl.
*G06K 9/00* (2022.01)
*G06T 5/00* (2006.01)
(Continued)

(52) U.S. Cl.
CPC ............. *G06T 5/005* (2013.01); *G06F 17/16* (2013.01); *G06N 3/045* (2023.01); *G06N 20/00* (2019.01); *G06V 10/764* (2022.01); *G06V 20/188* (2022.01)

(58) Field of Classification Search
CPC .. G06K 9/00657; G06N 20/00; G06N 3/0454; G06F 17/16
See application file for complete search history.

(56) References Cited

U.S. PATENT DOCUMENTS 8,712,148 B2  4/2014  Paris et al.
8,738,243 B2  5/2014  Sauder et al.
(Continued)

FOREIGN PATENT DOCUMENTS

CA  3078119  10/2018
WO  WO2016/176335  3/2016
WO  WO2017/099951  6/2017

OTHER PUBLICATIONS

Hughes MJ, Hayes DJ. Automated Detection of Cloud and Cloud Shadow in Single-Date Landsat Imagery Using Neural Networks and Spatial Post-Processing. Remote Sensing. 2014; 6(6):4907-4926. https://doi.org/10.3390/rs6064907 (Year: 2014).*

(Continued)

*Primary Examiner* — Fayyaz Alam
(74) *Attorney, Agent, or Firm* — Harness, Dickey & Pierce, P.L.C.

(57) ABSTRACT

Systems and methods for identifying clouds and cloud shadows in satellite imagery are described herein. In an embodiment, a system receives a plurality of images of agronomic fields produced using one or more frequency bands. The system also receives corresponding data identifying cloud and cloud shadow locations in the images. The system trains a machine learning system to identify at least cloud locations using the images as inputs and at least data identifying pixels as cloud pixels or non-cloud pixels as outputs. When the system receives one or more particular images of a particular agronomic field produced using the one or more frequency bands, the system uses the one or more particular images as inputs into the machine learning system to identify a plurality of pixels in the one or more particular images as particular cloud locations.

14 Claims, 10 Drawing Sheets

Related U.S. Application Data

(60) Provisional application No. 62/748,293, filed on Oct. 19, 2018.

(51) Int. Cl.
*G06F 17/16* (2006.01)
*G06N 20/00* (2019.01)
*G06V 20/10* (2022.01)
*G06N 3/045* (2023.01)
*G06V 10/764* (2022.01)

(56) References Cited

U.S. PATENT DOCUMENTS

| | | | |
|---|---|---|---|
| 8,767,194 B2 | 7/2014 | Preiner et al. | |
| 9,519,861 B1 | 12/2016 | Gates et al. | |
| 9,721,181 B2 * | 8/2017 | Guan | G06K 9/6227 |
| 10,989,839 B1 * | 4/2021 | Matthews | G06T 7/73 |
| 11,256,916 B2 | 2/2022 | She et al. | |
| 2010/0198420 A1 | 8/2010 | Rettger et al. | |
| 2013/0064420 A1 | 3/2013 | Amin et al. | |
| 2015/0094916 A1 | 4/2015 | Bauerer et al. | |
| 2016/0050840 A1 | 2/2016 | Sauder et al. | |
| 2017/0161584 A1 * | 6/2017 | Guan | G06K 9/4661 |
| 2018/0218502 A1 * | 8/2018 | Golden | G06T 7/0012 |
| 2018/0275314 A1 * | 9/2018 | Pavlovski | H02S 50/00 |
| 2020/0265562 A1 * | 8/2020 | Nagare | G06T 7/12 |

OTHER PUBLICATIONS

Hughes MJ, Hayes DJ. Automated Detection of Cloud and Cloud Shadow in Single-Date Landsat Imagery Using Neural Networks and Spatial Post-Processing. Remote Sensing 2014. 6(6).4907-49)26; https://doi.org/10.3900/rs6064907 (Year 2014).

* cited by examiner

Fig. 2
(a)
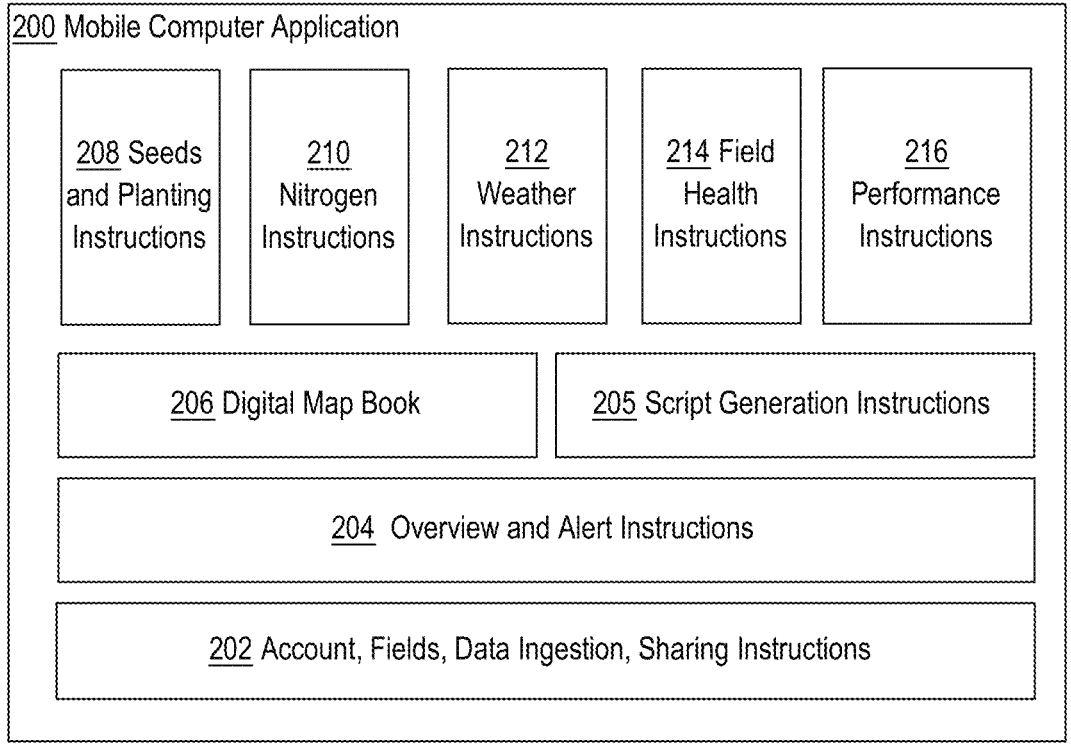
(b)
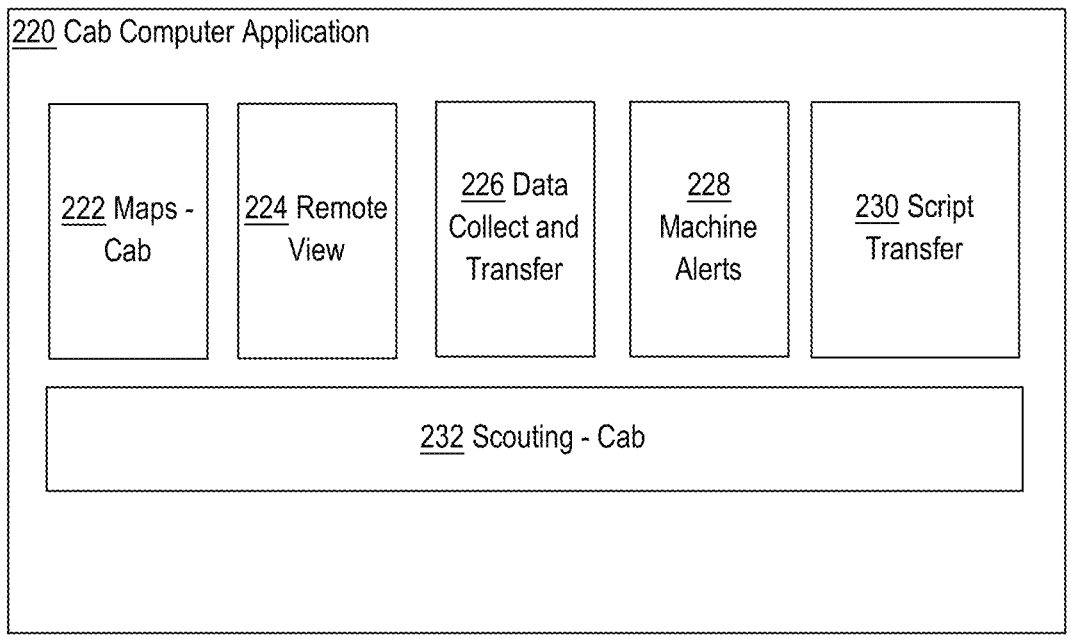

Data Manager

| Nitrogen | Planting | Practices | Soil |

Planting 1 (4 Fields)
Crop Corn Product
Plant Date: 2016-04-12
ILU 112 | Pop: 34000
[Edit] [Apply]

Planting 2 (0 Fields)
Crop Corn Product
Plant Date: 2016-04-15
ILU 83 | Pop: 34000
[Edit] [Apply]

Planting 3 (0 Fields)
Crop Corn Product
Plant Date: 2016-04-13
ILU 83 | Pop: 34000
[Edit] [Apply]

Planting 4 (1 Fields)
Crop Corn Product
Plant Date: 2016-04-13
ILU 112 | Pop: 34000
[Edit] [Apply]

[+ Add New Planting Plan]

| | CROP | PLANTED ACRES | PRODUCT | RELATIVE MATURITY | TARGET YIELD | POPULATION (AVG) | PLA |
|---|---|---|---|---|---|---|---|
| ☐ Select All | | | | | | | |
| ☐ Ames, IA 1 Corn \| 100 \| Boone, IA | Corn | --- | DMC82-M | 112 | 160 | 34000 | Apr |
| ☐ Austin, MN 1 Corn \| 100 \| Fredricks, MN | Corn | --- | DMC82-M | 114 | 160 | 36000 | Apr |
| ☐ Boone, IN 1 Corn \| 100 \| Boone, IA | Corn | --- | DMC82-M | 112 | 150 | 34000 | Apr |
| ☐ Champaign 1 Corn \| 100 \| Champaign, IL | Corn | --- | --- | 112 | 200 | 34000 | Apr |
| ☐ E Nebraska 1 Corn \| 100 \| Burt, NE | Corn | --- | --- | 112 | 160 | 34000 | Apr |

*FIG. 6*

MACHINE LEARNING TECHNIQUES FOR IDENTIFYING CLOUDS AND CLOUD SHADOWS IN SATELLITE IMAGERY

CROSS REFERENCE TO RELATED APPLICATIONS

This application is a continuation of U.S. application Ser. No. 16/657,957, filed on Oct. 18, 2019, which claims the priority of U.S. Provisional Application No. 62/748,293, filed Oct. 19, 2018, the entire contents of each of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2019 The Climate Corporation.

FIELD OF THE DISCLOSURE

One technical field of the present disclosure is image classification using machine learning techniques.

BACKGROUND OF THE DISCLOSURE

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Satellite imagery of agronomic fields can be extremely useful in agronomic modeling. For example, many agronomic yield models estimate the agronomic yield of a crop based on vegetative index values that are derived from satellite imagery. Thus, it can be extremely important that satellite imagery of a field is accurate as even slight variances in values can negatively impact the usefulness of the imagery for modeling purposes or display.

In many cases, clouds in the atmosphere partially or fully obscure a satellite sensor's view of the Earth's surface. The clouds may also cast shadows on the ground where less sunlight is reflected to the sensor. Both the clouds and the shadows of the clouds can negatively impact the usefulness of images containing the clouds and cloud shadows. For instance, a computation of an average vegetative index value for a field based on pixel values will be inaccurate if some of the pixels are darker due to the shadows of a cloud and other pixels are brighter due to the overlay of a shadow.

It is thus imperative in many cases for systems to be able to detect clouds and cloud shadows in satellite imagery. Classification techniques have been developed which can identify clouds and cloud shadows with fairly high accuracy. For example, U.S. Pat. No. 9,721,181, the entire contents of which are incorporated by reference as if fully described herein, describes a three-step process for identifying clouds and cloud shadow pixels and using the identified pixels to create a cloud mask and shadow mask of a remote sensing image.

Generally, detecting cloud boundaries or thinner clouds can be difficult due to varying opacity of pixels near the border of clouds or in thinner clouds. Thus, pixels that should be removed or masked in an image may be missed.

Thus, there is a need for a system which leverages information regarding surrounding pixels in an image in order to identify pixels as clouds or cloud shadows.

SUMMARY OF THE DISCLOSURE

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

DETAILED DESCRIPTION OF THE DISCLOSURE

Figure 1:
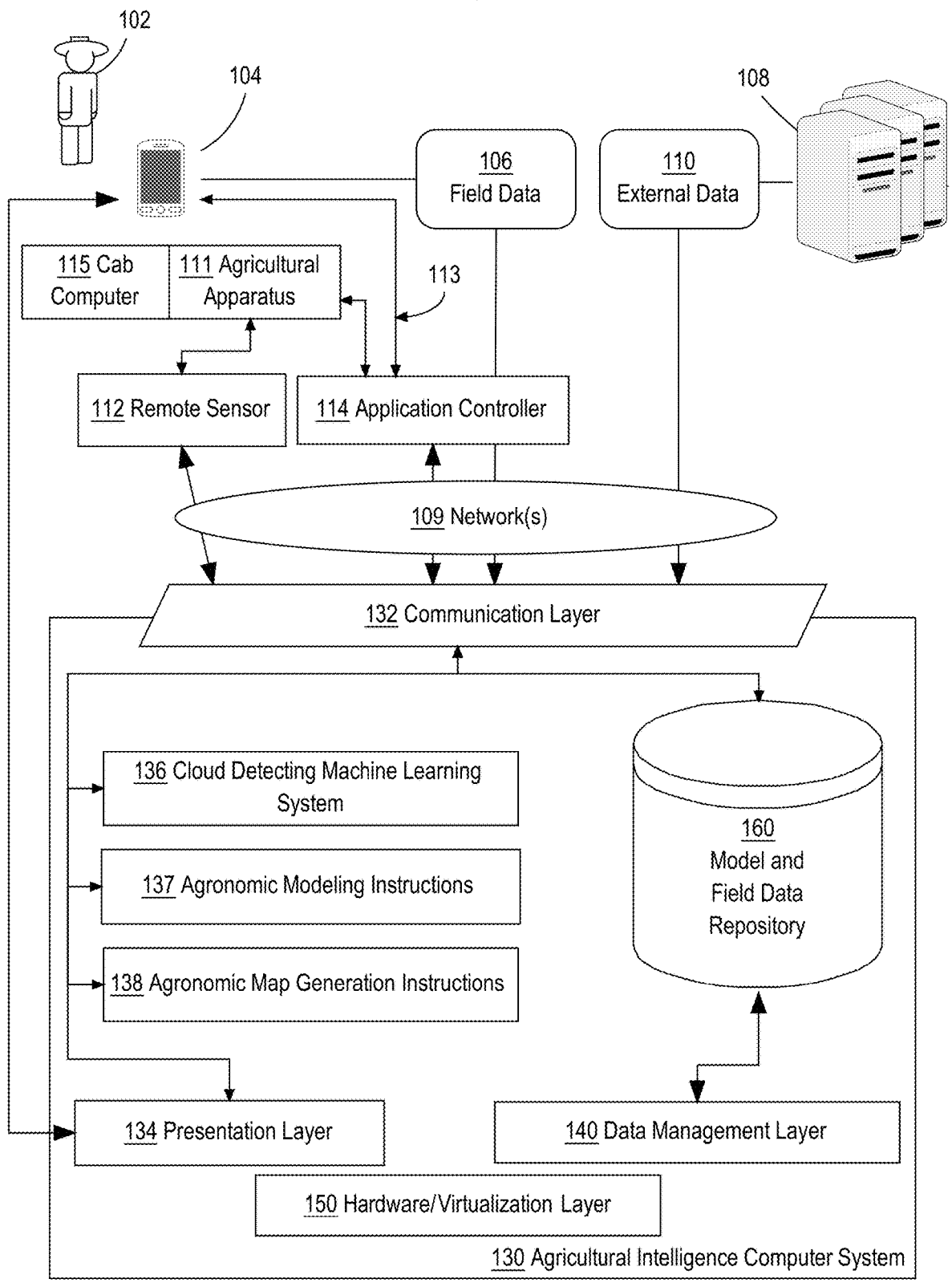
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW 3. CLOUD AND CLOUD SHADOW DETECTION SYSTEM
   3.1. RECEIVED DATA
   3.2. CLOUD IDENTIFYING MACHINE LEARNING SYSTEM
   3.3. CLOUD AND CLOUD SHADOW SEGMENTATION
4. REPLACING IDENTIFIED CLOUD PIXELS
5. AGRONOMIC MODELING
6. AGRONOMIC MAP DISPLAY
7. BENEFITS OF CERTAIN EMBODIMENTS

1. General Overview

Systems and methods are described for using a machine learning system that leverages information regarding classification of surrounding pixels to identify clouds and cloud shadows in an image. In an embodiment, a system receives a plurality of images of agronomic fields as well as data identifying pixels as clouds or cloud shadows in the images. The system trains a machine learning system, such as a convolutional encoder-decoder, using the images as inputs and the data identifying pixels as clouds as outputs. When the system receives an image of any agronomic field, the system uses the machine learning system, which has been trained to classify pixels based on surrounding pixel values, to identify pixels in the image as cloud pixels or non-cloud pixels. In an embodiment, the system additionally uses geometric techniques to identify candidate cloud shadow locations in the training data and trains a second machine learning system to identify cloud shadow pixels using the images and candidate cloud shadow locations as inputs and data identifying pixels as cloud shadow pixels as outputs.

In an embodiment, a computer implemented method comprises receiving a plurality of images of agronomic fields produced using one or more frequency bands; receiving corresponding data identifying cloud and cloud shadow locations in the images; training a machine learning system to identify at least cloud locations using the images as inputs and at least data identifying pixels as cloud pixels or non-cloud pixels as outputs; receiving one or more particular images of a particular agronomic field produced using the one or more frequency bands; using the one or more particular images as inputs into the machine learning system, identifying a plurality of pixels in the one or more particular images as particular cloud locations.

In an embodiment, a computer implemented method comprises receiving a plurality of images of agronomic fields produced using one or more frequency bands; receiving corresponding data identifying cloud and cloud shadow locations in the images; training a first machine learning system to identify cloud locations using the images as inputs and data identifying pixels as cloud pixels or non-cloud pixels as outputs; using the data identifying cloud locations, identifying a plurality of candidate cloud shadow locations; training a second machine learning system to identify cloud shadow locations using the images and the candidate cloud shadow locations as inputs and data identifying pixels as cloud shadow pixels or non-cloud shadow pixels as outputs; receiving one or more particular images of a particular agronomic field produced using the one or more frequency bands; using the one or more particular images as inputs into the first machine learning system, identifying a plurality of pixels in the one or more particular images as particular cloud locations; using the particular cloud locations, identifying a plurality of particular candidate cloud shadow locations; using the one or more particular images and the plurality of particular candidate cloud shadow locations as inputs into the second machine learning system, identifying a plurality of pixels in the one or more particular images as particular cloud shadow locations.

2. Example Agricultural Intelligence Computer System

2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
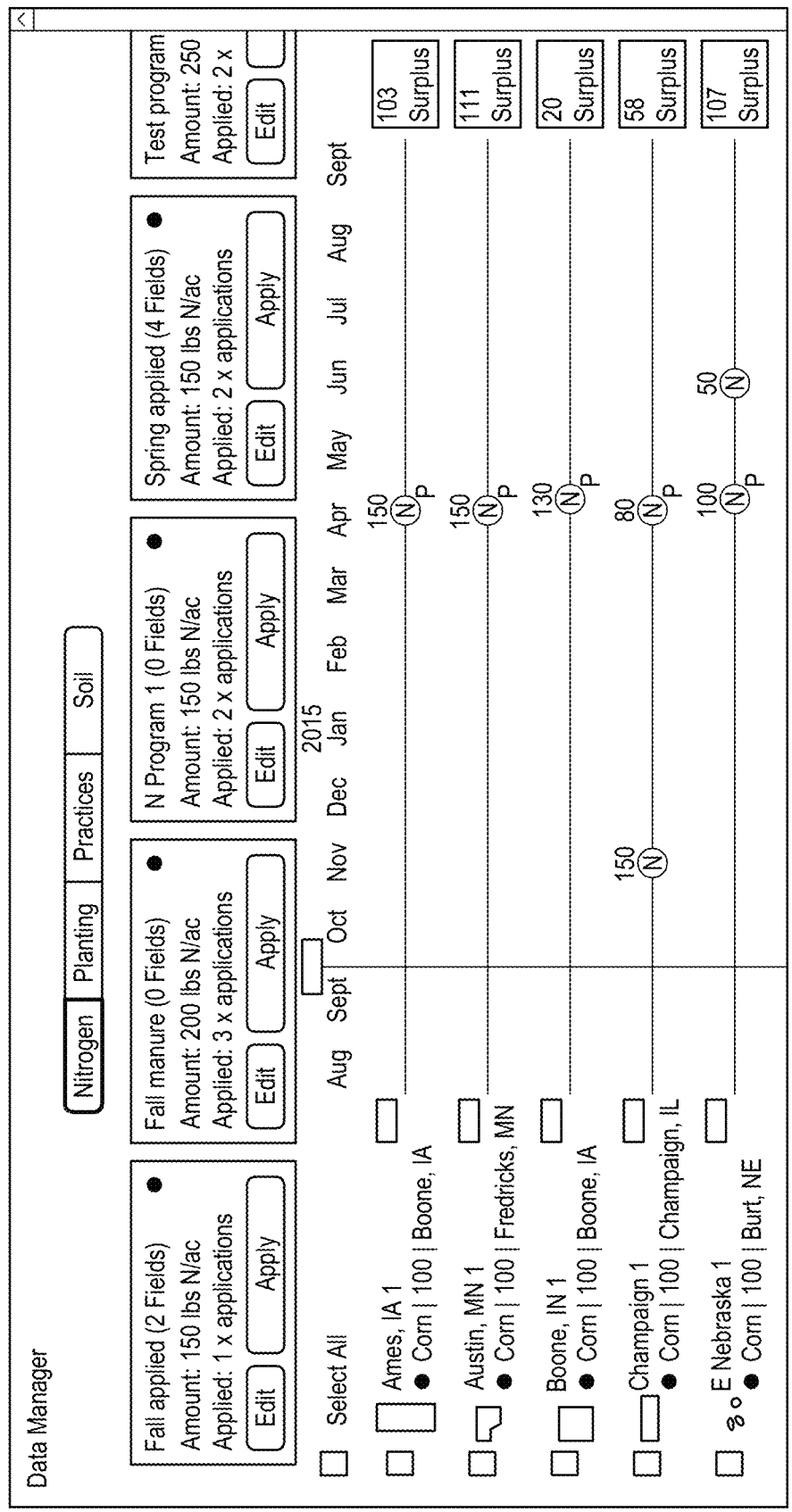
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, each of cloud detecting machine learning system 136, agronomic modeling instructions 137, and agronomic map generation instructions 138 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. For example, the agronomic modeling instructions 137 may comprise a set of pages in RAM that contain instructions which when executed cause performing the agronomic modeling functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of cloud detecting machine learning system 136, agronomic modeling instructions 137, and agronomic map generation instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Cloud detecting machine learning system 136 comprise computer readable instructions which, when executed by one or more processors, cause agricultural intelligence computer system 130 to computationally detect cloud and/or cloud shadow pixels in satellite imagery. Agronomic modeling instructions 137 comprise computer readable instructions which, when executed by one or more processors, cause agricultural intelligence computer system 130 to generate an agronomic model of an agronomic field based, at least in part, on values derived from satellite imagery. Agronomic map generation instructions 138 comprise computer readable instructions which, when executed by one or more processors, cause agricultural intelligence computer system 130 to generate an agronomic map for display based, at least in part, on satellite imagery and data identifying pixels in the satellite imagery as cloud or cloud shadow pixels.

Figure 4:
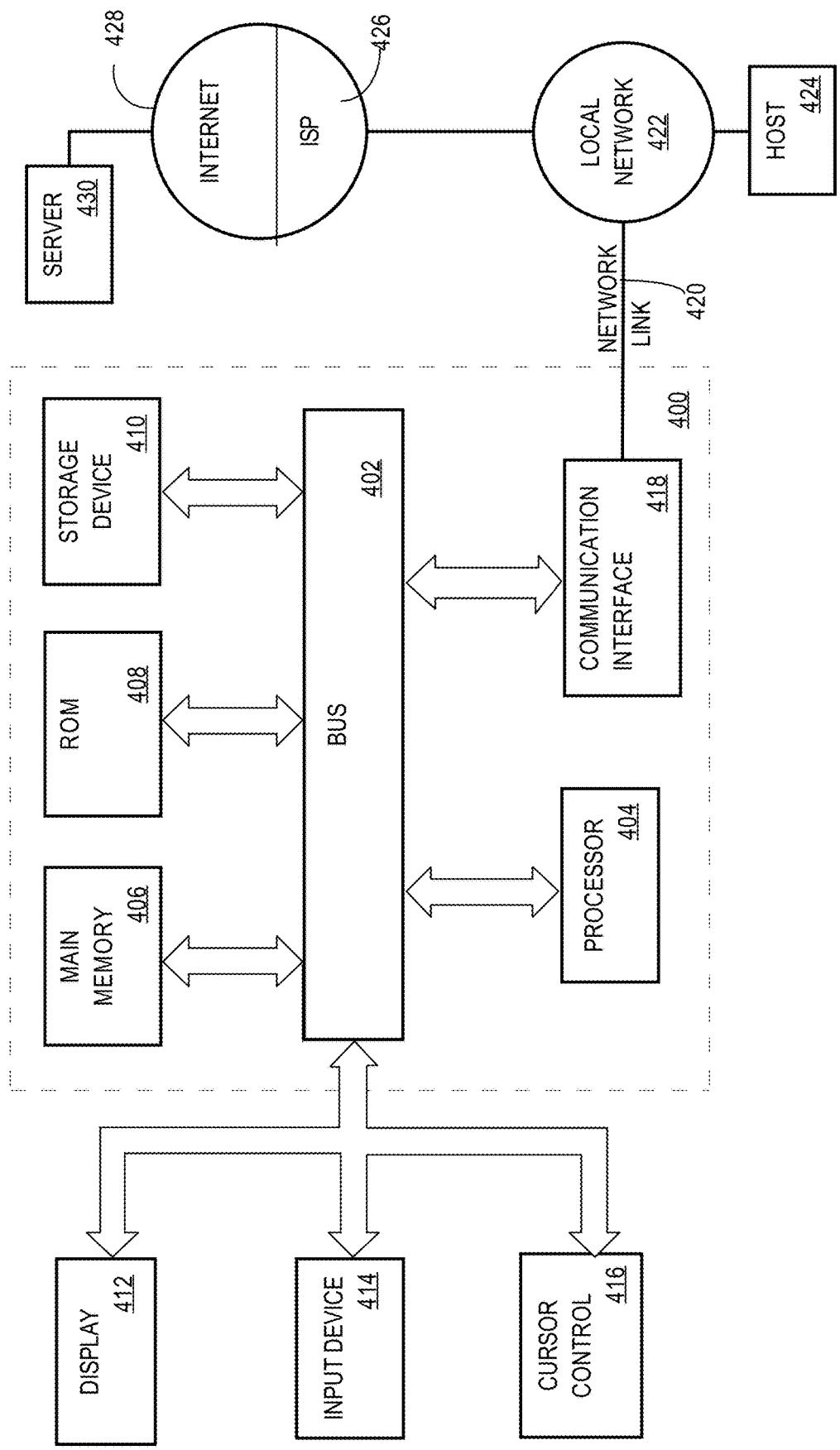
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
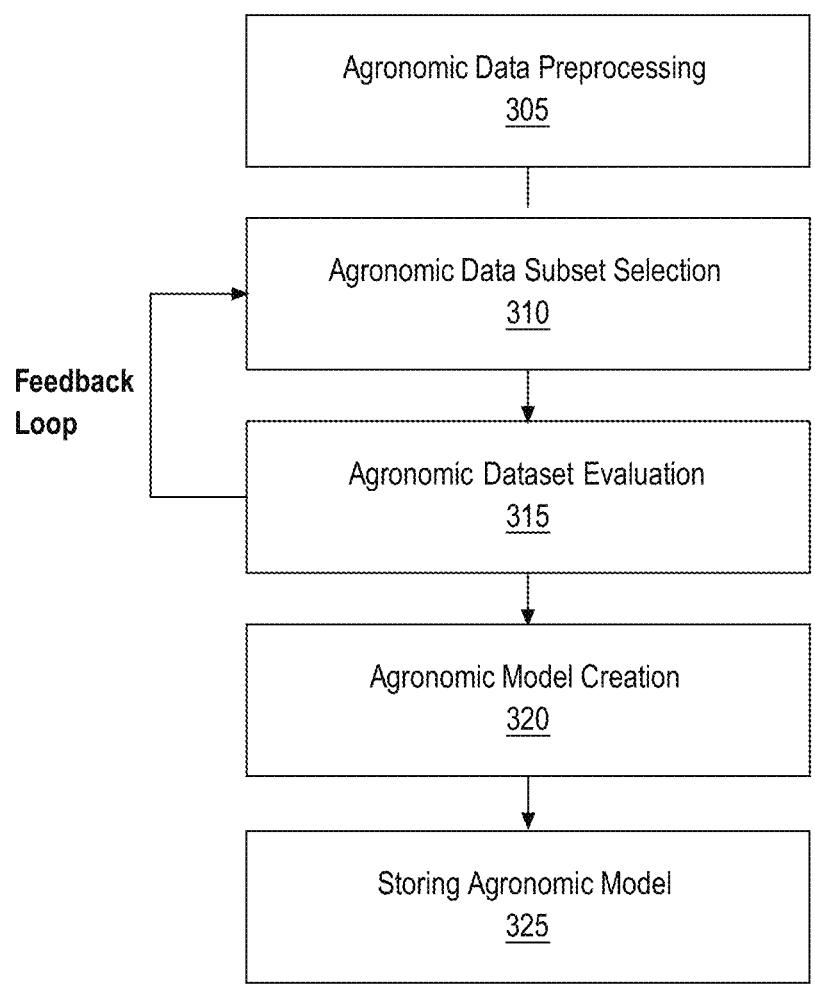
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Cloud and Cloud Shadow Detection System

Figure 7:
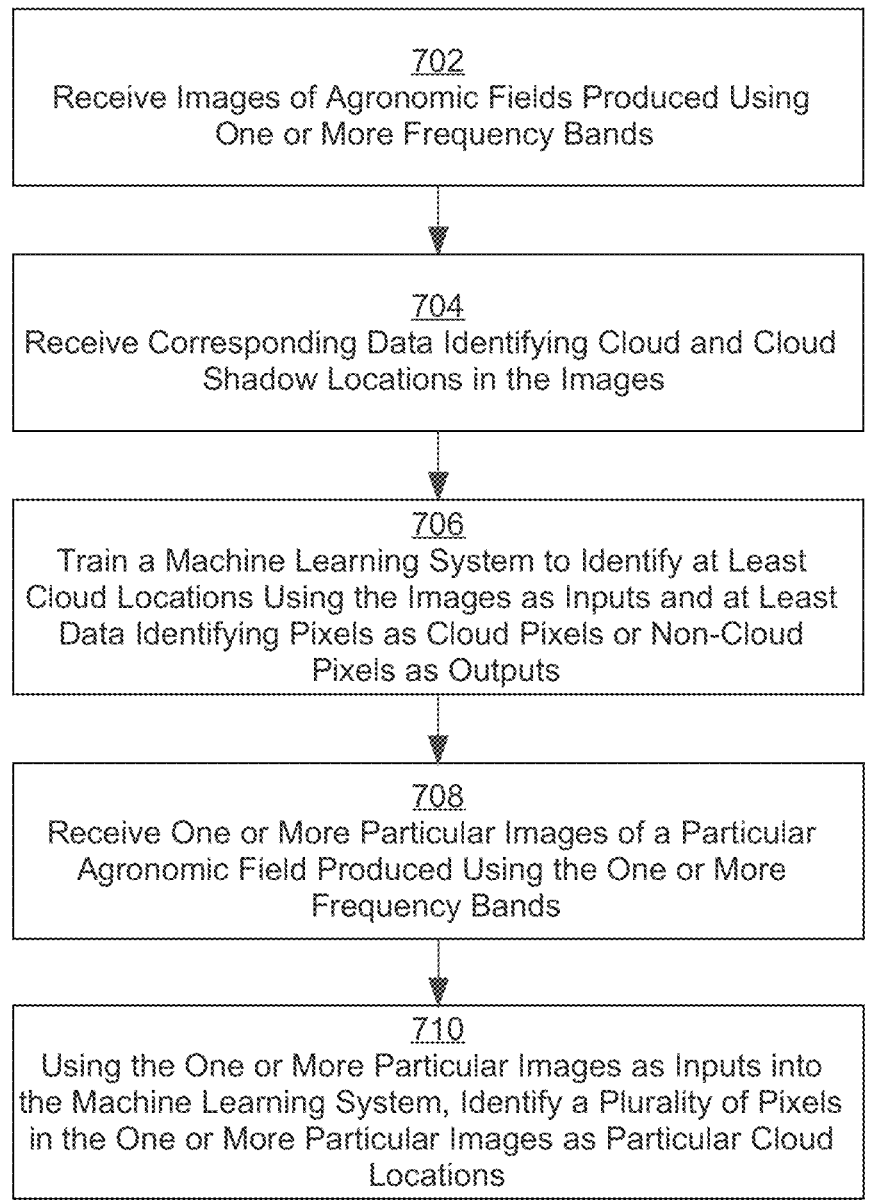
FIG. 7 depicts an example method for using a machine learning system to identify pixels in an image as cloud locations.

FIG. 7 depicts an example method for using a machine learning system to identify pixels in an image as cloud locations.

3.1. Received Data

At step 702, images of agronomic fields produced using one or more frequency bands are received. The images of the agronomic field may be produced by a satellite configured to capture images in a plurality of frequency bands. For example, the SENTINEL-2 satellite operated by the EUROPEAN SPACE AGENCY produces images in a plurality of frequency bands including a red frequency band, a blue frequency band, a green frequency band, a near infrared frequency band, and a water vapor frequency band.

The agricultural intelligence computer system may receive a plurality of sets of images directly or indirectly from the satellite where each set of images comprises an image in each frequency band corresponding to a same location. The system may receive any number of the above described frequency bands and/or different frequency bands for use in detecting cloud and cloud shadow in an image. The data may be received as a series of pixel values for images of each frequency band, the pixel values corresponding to pixel locations. In an embodiment, each image in a set of images is of a same size with pixels corresponding to overlapping locations. For instance, the Nth pixel of the red frequency band image of an agronomic field may correspond to the Nth pixel of the blue frequency band image of the agronomic field in the same set as the red frequency band image.

At step 704, corresponding data identifying cloud and cloud shadow locations in the images is received. The data may indicate, for each pixel of the images in a set of images, whether the pixel is a non-cloud pixel, a cloud pixel, or a cloud shadow pixel. For example, a set of images may include three frequency band images, each of which comprising 300×300 pixels with the Nth pixel of each image corresponding to the same location on the agronomic field. The corresponding data may thus indicate, for each pixel of the 300×300 pixel images, whether the pixel is a non-cloud pixel, a cloud pixel, or a cloud shadow pixel. Thus, if the system receives 300×300 pixel images of an agronomic field in three frequency bands, the system may store three 300×300 matrices, each of which corresponding to a frequency band, and a fourth 300×300 matrix where each element of the matrix is one of three values, such as 0, 1, and 2, which correspond to non-cloud pixels, cloud pixels, or cloud shadow pixels.

While embodiments are described where received data indicates both cloud and cloud shadow in a single mapping, in embodiments where a machine learning system is only used to identify cloud locations, the system may store a matrix indicating only the locations of cloud and non-cloud pixels where the non-cloud pixels include cloud-shadow pixels. For embodiments where a second machine learning system is used to identify cloud shadow locations, the system may store a matrix indicating only the locations of cloud-shadow and non-cloud shadow pixels, thereby allowing the system to identify clouds and cloud shadows separately using the methods described further herein.

3.2. Cloud Identifying Machine Learning System

At step 706, the system trains a machine learning system to identify at least cloud locations using the images as inputs and at least data identifying cloud pixels and non-cloud pixels as outputs. The machine learning system may comprise any machine learning system which is capable of accepting one or more matrices of values as inputs and generating one or more matrices of values as outputs, such as a convolutional neural network.

In an embodiment, the machine learning system is a convolutional encoder-decoder for pixel-wise classification. For example, the machine learning system may be the SegNet convolutional encoder-decoder architecture available on GITHUB. In order to capture relationships between adjacent pixels, the machine learning system may include a plurality of convolutional encoding steps interspersed with pooling steps and a plurality of convolutional decoding steps interspersed with upsampling steps. In one embodiment, the SegNet convolutional encoder-decoder is configured using a stochastic gradient descent optimizer, a learning rate of 0.001, a decay of 1e-6, a momentum of 0.9, and Nesterov set to True.

As used herein, a pooling step comprises a step of reducing a spatial size of a representation. For example, a maxpooling step may comprise a step of reducing a size of a matrix by selecting a maximum value in each 2×2 portion of the matrix. As used herein, an upsampling step comprises a step of increasing a spatial size of a representation, such as by inserting values into the matrix or duplicating values in the matrix. As used herein, a softmax layer comprises a layer where a softmax function is applied to the dataset, the softmax function taking an input of real numbers and normalizing the input into a probability distribution.

Figure 8:
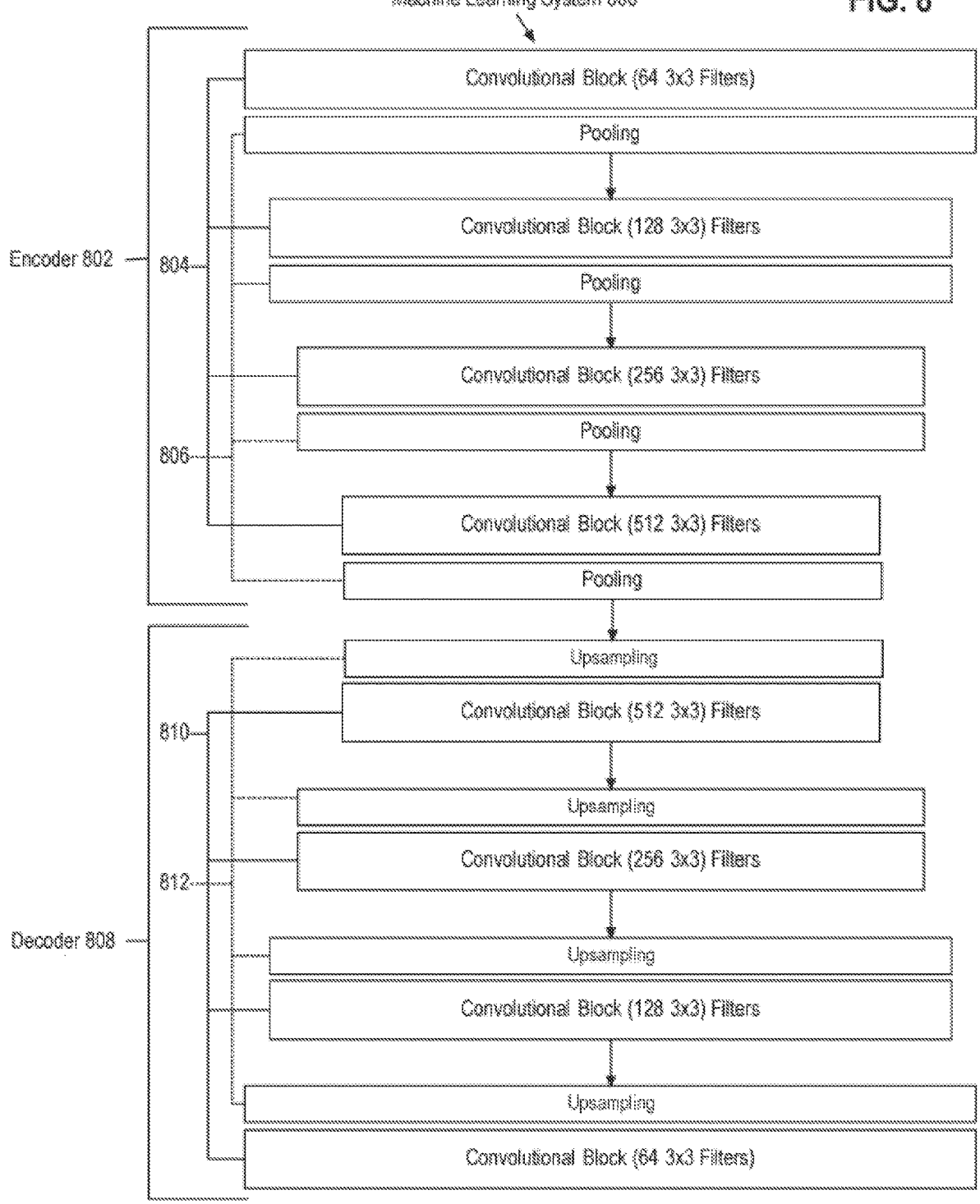
FIG. 8 depicts an example convolutional encoder-decoder machine learning system.

FIG. 8 depicts an example convolutional encoder-decoder machine learning system. Machine learning system 800 includes encoder 802 and decoder 808. Encoder 802 includes convolutional blocks 804 followed by pooling steps 806. In the example machine learning system 800, the convolutional blocks 804 of encoder 802 include increasing number of 3×3 filters, with the first convolutional block comprising 64 3×3 filters and the final convolution block comprising 512 3×3 filters. The convolutional blocks are used to produce a set of feature maps. Pooling steps 806 are performed to achieve translation invariance over small spatial shifts.

Decoder 808 includes convolutional blocks 810 and upsampling steps 812. The decoder performs upsampling steps 812 to upsample feature input maps using memorized maxpooling indices from the corresponding pooling step, with the final pooling step corresponding to the initial upsampling step. Convolutional blocks 810 are also a mirror of convolutional blocks 804, with the first including 512 3×3 filters and the final block including 64 3×3 filters, thereby ensuring the output is of the same size and resolution as the input. In an embodiment, a convolutional block including two classes (cloud and non-cloud) of 1×1 filters are applied after the decoder. A softmax layer may be added as the final classification layer to select the highest probability output.

In an embodiment, the system uses a machine learning system which is capable of being trained on images of varying sizes and is capable of producing outputs with images of different sizes. The system may utilize a machine learning system which has been modified to accept inputs of varying sizes. For example, the SegNet convolutional encoder-decoder is traditionally fit with an image with an input size of 360×480 and a built in reshape function is used to reshape the output vector of the SegNet convolutional encoder-decoder into an image map vector during training. To allow the SegNet convolutional encoder-decoder to work with images of varying sizes, the input size may be specified as (None, None). A customized machine learning layer may then reshape the build of the vector based on a symbolic shape of the output tensor, thereby allowing the model to accept images of varying sizes as long as the size of each input image matches the size of its corresponding output image during training.

While the above method allows the machine learning system to utilize images of varying sizes, some image sizes may create issues during the pooling steps due to odd numbers of pixels. For example, FIG. 8 includes three maxpooling steps which effectively reduce the size of the image by a factor of eight. Thus, the system may be configured to ensure that the inputs and corresponding outputs include a multiple of eight pixels for both the width and height. For example, if an image has 365×484 pixels, the system may add 3 rows of pixels and 4 columns of pixels, each with a pixel value of 0, to the input image and the output matrix, thereby ensuring that the training of the machine learning system does not improperly round pixel values. Additionally, inputs into the machine learning system may be likewise modified to produce an output image of the same size. After the output is created, the machine learning system may remove any added rows or columns. Additionally or alternatively, the system may truncate the inputs and corresponding outputs to ensure that the inputs and corresponding outputs include a multiple of eight pixels for both the width and height, such as by removing columns and/or rows for training.

In an embodiment, the machine learning system is trained using a plurality of stacked matrices as inputs and a single matrix identifying locations of clouds as outputs. For example, if the machine learning system is trained on three frequency bands, each input/output pairing would include three stacked matrices as inputs and a single cloud identifying matrix as an output. Each of the three input matrices for the input/output pairing may correspond to a different frequency band and comprise pixel values for that frequency band. An example of the output single cloud identifying matrix is a matrix of 0s and is where a 0 indicates that the pixel does not correspond to a cloud location and a 1 indicates that the pixel corresponds to a cloud location.

In an embodiment, a single machine learning system is trained to identify both clouds and cloud shadows in images. The machine learning system may be configured to separately identify clouds and cloud shadows. For example, instead of the output matrices including only 0s and 1s, the output matrices may include 0s, 1s, and 2s where a 0 indicates that the pixel does not correspond to a cloud location, a 1 indicates that the pixel corresponds to a cloud location, and a 2 indicates that the pixel corresponds to a cloud shadow location. While both clouds and cloud shadow pixels are identified for the purpose of removal and/or replacement, the system is able to more efficiently distinguish between clouds/cloud shadows and pixels that are neither cloud nor cloud shadow by training the machine learning system with three outputs instead of two.

Referring again to FIG. 7, at step 708, one or more particular images of a particular agronomic field produced using the one or more frequency bands are received. The agricultural intelligence computer system may receive a set of images directly or indirectly from a satellite where the set of images comprises an image in each frequency band corresponding to the same location. In an embodiment, the received set of images includes an image in each frequency band used to train the machine learning system. For example, if the machine learning system was trained using red, blue, and green frequency bands, the received set of images corresponding to the same location may include at least an image in each of the red, blue, and green frequency bands.

At step 710, the system uses the machine learning system and the one or more particular images to identify a plurality of pixels in the one or more particular images as particular cloud locations. For example, the agricultural intelligence computer system may compute an output matrix for one or more input matrices generated from the one or more images using the trained machine learning system. The output matrix may indicate, for each pixel, whether the pixel corresponds to a cloud or to a non-cloud location. In embodiments where the machine learning system is configured to identify cloud shadows in addition to clouds, the output additionally indicates whether a pixel is a cloud shadow. In some embodiments, the output indicates a likelihood that the pixel is a cloud, cloud shadow, or neither. Additionally or alternatively, a softmax layer may be used to select a classification based on a highest probability.

3.3. Cloud and Shadow Segmentation

Figure 9:
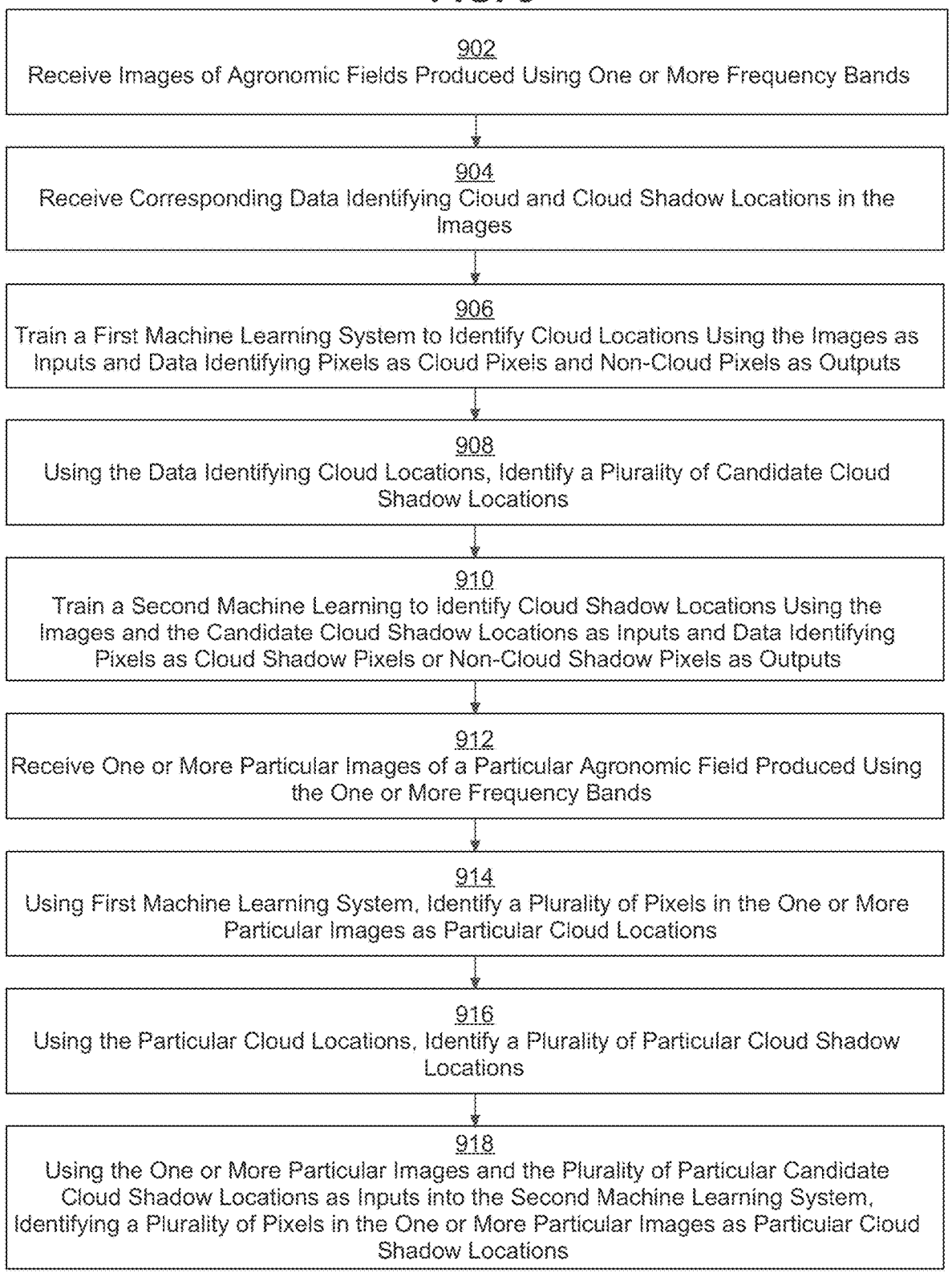
FIG. 9 depicts a method of using a first machine learning system to identify pixels in an image as cloud locations and a second machine learning system to identify pixels in an image as cloud shadow locations.

In an embodiment, the server computer segments the identification of the cloud and the identification of the cloud shadow. For example, the system may utilize a first machine learning system to identify locations of the clouds and, using the identified locations of the clouds, generate additional inputs for a second machine learning system to use to compute locations of cloud shadows. FIG. 9 depicts a method of using a first machine learning system to identify pixels in an image as cloud locations and a second machine learning system to identify pixels in an image as cloud shadow locations.

At step 902, images of agronomic fields produced using one or more frequency bands are received. The agricultural intelligence computer system may receive a plurality of sets of images directly or indirectly from the satellite where each set of images comprises an image in each frequency band corresponding to a same location. At step 904, corresponding data identifying cloud and cloud shadow locations in the images is received. The data may indicate, for each pixel of the images in a set of images, whether the pixel is a non-cloud/cloud shadow pixel, a cloud pixel, or a cloud shadow pixel.

In an embodiment, the agricultural intelligence computer system additionally receives metadata relating to the capture of each set of images. The metadata may indicate one or more of a time of image capture, a location of the satellite at the time of the image capture, an angle of the sun on the satellite at the time of the image capture, a height of the satellite at the time of the image capture, or a distance between the satellite and the location to which the image corresponds.

At step 906, the system trains a first machine learning system to identify cloud locations using the images as inputs and data identifying pixels as cloud pixels or non-cloud pixels as outputs. The first machine learning system may comprise any machine learning system which is capable of accepting one or more matrices of values as inputs and generating one or more matrices of values as outputs, such as a convolutional neural network. The system may train the first machine learning system using matrices representing the one or more images as inputs and data identifying whether a pixel is a cloud or non-cloud as output. Thus, if the agricultural intelligence computer system received data identifying each pixel as cloud, cloud shadow, or neither cloud or cloud shadow, the agricultural intelligence computer system may group the cloud shadow pixels in with the other non-cloud pixels.

At step 908, using the data identifying cloud locations, the system identifies a plurality of candidate cloud shadow locations. For instance, a two-dimensional image of a field with a cloud hovering over it could be taken from any number of angles with varying cloud height and cloud size. The system may identify a plurality of possible locations for the cloud shadows in an image based on the locations of the cloud. For instance, the system may iterate over a plurality of angles and heights to determine different possible sizes and locations of cloud shadows.

In an embodiment, the system utilizes received metadata to decrease the number of variables in determining the locations of cloud shadows. For example, the metadata may identify the location of the field, location and angle of the satellite, and angle of the sun at the time the image is captured. The system may utilize the metadata to fix the satellite and sun position with respect to the field. The system may then use the identified cloud locations in the images to determine different possible positions of the cloud pictured in the image. Using the different cloud locations, the system may identify a plurality of cloud shadow locations. For example, cloud shadow locations may be computed as a function of the sun location and the cloud's location and size.

In an embodiment, for each of the plurality of identified positions the identified clouds, the system produces a cloud shadow map. The cloud shadow map includes a plurality of pixel values which indicate whether or not the pixel is a cloud shadow. In an embodiment, the pixels in the cloud shadow map additionally indicate whether the pixel is a cloud.

Figure 10:
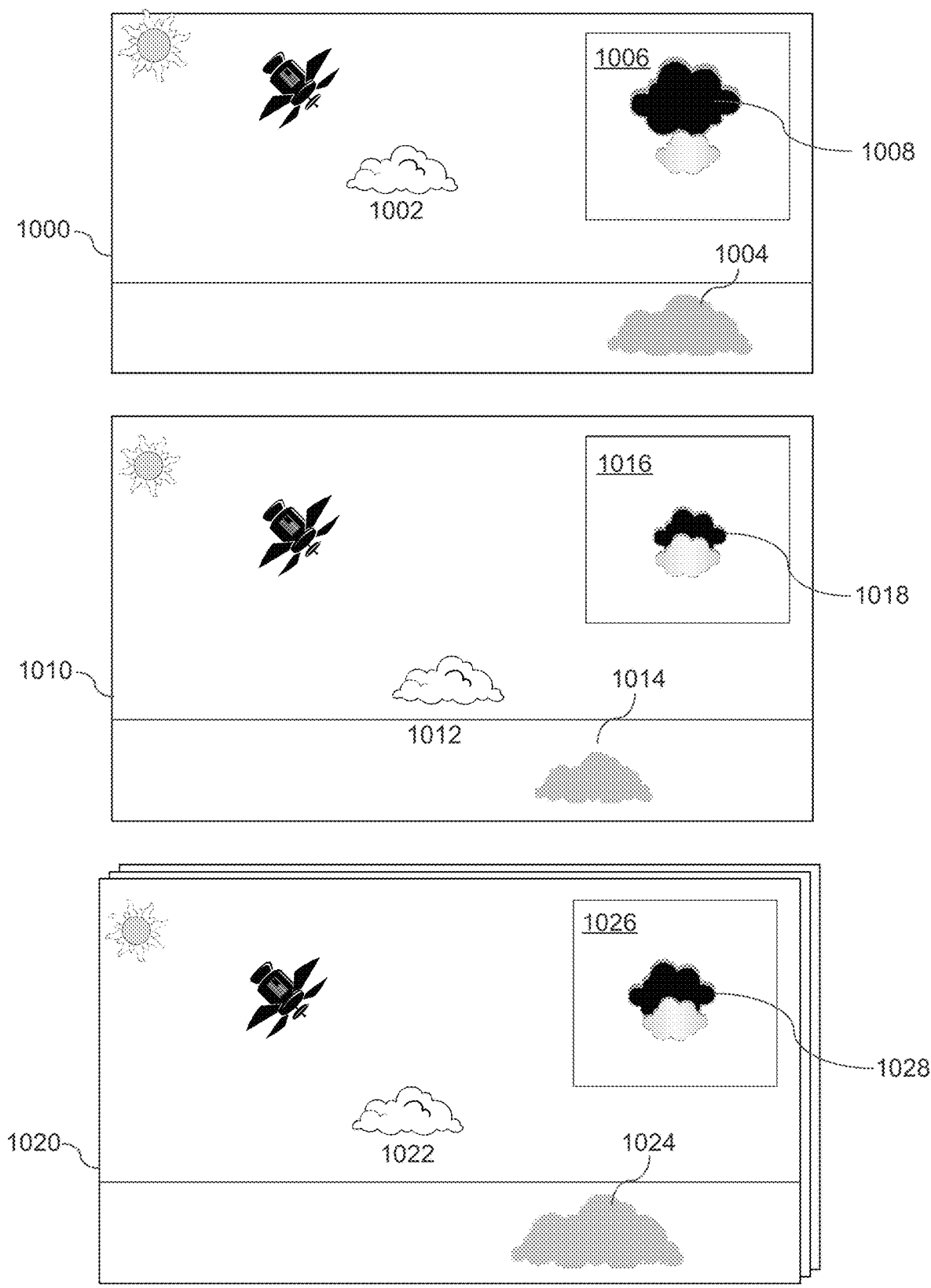
FIG. 10 depicts a plurality of images comprising cloud shadow locations generated based on varying assumptions of satellite angle and cloud height.

FIG. 10 depicts a plurality of images comprising cloud shadow locations generated based on varying assumptions of satellite angle and cloud height. FIG. 10 includes maximum height assumption 1000, minimum height assumption 1010, and interim height assumptions 1020.

Maximum height assumption 1000 comprises an assumption of the three-dimensional cloud location and size at a predetermined maximum height based on the two-dimensional identified cloud location in the image. For instance, the predetermined maximum height may be 10,000 meters. The system may determine the likely size and location of the cloud 1002 based on the position of the satellite, size of the identified cloud in the image, and predetermined maximum height. Based on the determined likely size and location of the cloud 1002 and the location and angle of the sun, the system may determine a likely location of the cloud shadow 1004. The system may then generate a cloud shadow map 1006 with pixels 1008 identifying the location of the cloud shadow 1004. For example, the system may generate a pixel map with values of 0 or 1 where each location with a value of 1 is a location which the system has determined likely contains a cloud shadow and a value of 0 corresponds to a location which the system has determined does not likely contain a cloud shadow.

Minimum height assumption 1010 comprises an assumption of the three-dimensional cloud location and size at a predetermined minimum height based on the two-dimensional identified cloud location in the image. For instance, the predetermined minimum height may be 2,000 meters.

The system may determine the likely size and location of cloud 1012 based on the position of the satellite, size of the identified cloud in the image, and predetermined minimum height. Based on the determined likely size and location of the cloud 1012 and the location and angle of the sun, the system may determine a likely location of the cloud shadow 1014. The system may then generate a cloud shadow map 1016 with pixels 1018 identifying the location of the cloud shadow 1014.

Interim height assumptions 1020 comprise a plurality of interim assumptions of the three-dimensional cloud location and size between the maximum height and the minimum height based on the two-dimensional cloud location in the image. For instance, the system may generate a new interim assumption for every 2,000 meters of height between the minimum predetermined height and the maximum predetermined height. The system may determine, for each interim assumption, the likely location of the cloud 1022 based on the position of the satellite, size of the identified cloud in the image, and cloud height in the interim assumption. Based on the likely size and location of the cloud 1022 and the location and angle of the sun, the system may determine a likely location of the cloud shadow 1024 for the interim assumption. The system may then generate a cloud shadow map 1026 with pixels 1028 identifying the location of the cloud shadow 1024.

While FIG. 10 depicts an example of iterating over one variable, i.e. the height of the cloud, embodiments may include iterations over a plurality of variables. For example, if the metadata includes an angle of the sun, but not the angle and/or location of the satellite at the time of image capture, the system may iterate over both satellite angle and/or location and heights of the cloud. Thus, one candidate cloud shadow location may be generated based on an assumption of the lowest cloud height at the shallowest satellite angle, one may be generated based on an assumption of the highest cloud height at the shallowest satellite angle, one may be generated based on an assumption of the lowest cloud height at the steepest satellite angle, and one may be generated based on an assumption of the highest cloud height at the steepest satellite angle.

Referring again to FIG. 9, at step 910, the system trains a second machine learning system to identify cloud shadow locations using the images and the candidate cloud shadow locations as input and data identifying cloud shadow locations as outputs. The second machine learning system may comprise any machine learning system which is capable of accepting one or more matrices of values as inputs and generating one or more matrices of values as outputs, such as a convolutional neural network.

The system may train the second machine learning system using matrices representing the one or more images and matrices representing the identified candidate cloud shadow locations as inputs and data identifying whether a pixel is a cloud shadow or non-cloud shadow as output. For instance, if the first machine learning system was trained using training datasets comprising three stacked image matrices as the inputs and a matrix representing cloud locations as the output for each training dataset, the second machine learning system may be trained using training datasets comprising ten stacked matrices as inputs and a matrix representing cloud shadow locations as the output for each training dataset, the ten stacked matrices including the three stacked image matrices and seven stacked candidate cloud location matrices. In this manner, the system utilizes relationships between clouds and cloud shadows to increase the efficacy of the machine learning model in detecting cloud shadows.

At step 912, one or more particular images of a particular agronomic field produced using the one or more frequency bands are received. The agricultural intelligence computer system may receive a set of images directly or indirectly from a satellite where the set of images comprises an image in each frequency band corresponding to the same location. In an embodiment, the received set of images includes an image in each frequency band used to train the machine learning system. For example, if the machine learning system was trained using red, blue, and green frequency bands, the received set of images corresponding to the same location may include at least an image in each of the red, blue, and green frequency bands.

At step 914, the system uses the first machine learning system and the one or more particular images to identify a plurality of pixels in the one or more particular images as particular cloud locations. For example, the agricultural intelligence computer system may compute an output matrix for input matrices generated from the one or more particular images using the trained first machine learning system. The output matrix may indicate, for each pixel, whether the pixel corresponds to a cloud or to a non-cloud location.

At step 916, the system identifies a plurality of particular candidate cloud shadow locations using the particular cloud locations. For example, the system may use the techniques described herein to iterate over a plurality of different cloud heights and sizes based on the particular cloud locations to generate a plurality of cloud shadow maps, each cloud shadow map including one or more cloud shadow locations based on a cloud height and size assumption generated from the identified particular cloud locations.

At step 918, the system uses the second machine learning system, the plurality of particular candidate cloud shadow locations, and the one or more particular images to identify a plurality of pixels in the one or more particular images as particular cloud shadow locations. For example, the agricultural intelligence computer system may compute an output matrix for input matrices generated from the one or more particular images and the cloud shadow maps using the trained second machine learning system. The output matrix may indicate, for each pixel, whether the pixel corresponds to a cloud shadow or to a non-cloud shadow location.

4. Replacing Identified Cloud Pixels

In an embodiment, the system utilizes the systems and methods described herein to improve images of agronomic fields by replacing pixels that comprise cloud or cloud shadows. For example, the system may remove all pixels that have been identified by cloud or cloud shadows from the image. The system may then insert pixels into the locations where pixels had been removed.

In an embodiment, the system uses additional images of the agronomic location to augment an image of an agronomic field where one or more pixels were removed for containing clouds and cloud shadows. For example, the agricultural intelligence computer system may receive additional images of the locations captured at a different time and/or day. The system may use the methods described herein to identify clouds and cloud shadows in the additional images for removal. The system may then identify non-cloud and non-cloud shadow pixels in the additional images that correspond to a same physical location as cloud or cloud shadow pixels in the initial image. The system may then fill the empty spots of the initial image with the identified non-cloud and non-cloud shadow pixels from the additional images.

In an embodiment, the system interpolates pixel values from non-cloud and non-cloud shadow locations in an image to the pixels that were removed for containing cloud or cloud shadows. For example, the system may use one or more image interpolation algorithms to determine image pixel values for removed pixels based on the image pixel values of surrounding pixels in the image. As another example, the system may utilize a machine learning system trained using images with null values for any cloud and cloud-shadow locations as inputs and images with identified pixel values for the cloud and cloud shadow locations as outputs to identify pixel values for the removed pixels.

5. Agronomic Modeling

In an embodiment, the system utilizes the systems and methods described herein to improve agronomic modeling for agronomic fields in images with clouds and cloud shadows. For example, an agronomic yield model may be configured to model a yield of a crop as a function of at least an average normalized difference vegetation index (NDVI) value or other index values across the field. As the index values are generated from images of crops on a field, clouds and cloud shadows may negatively impact index values on those locations of the field. Thus, the system may ignore pixels that have been identified as containing clouds or cloud shadows when computing average index values for the purpose of agronomic modeling. Additionally, the system may be configured to identify the pixel as part of the field for other purposes, such as total yield modeling, but without a pixel value. Thus, if the average vegetative index is applied to all locations on the field, the pixel may be given the average vegetative index value despite not being used for the computation of the average vegetative index value.

In an embodiment, the system filters images for use in modeling based on data identifying clouds and cloud shadows. For example, the system may remove all images that contain clouds or cloud shadows and only use images that are free of clouds or cloud shadows for modeling purposes. Removing the images containing clouds or cloud shadows may comprise generating, from a set of images of a field, a strict subset of images that were not identified as containing clouds or cloud shadows. Additionally or alternatively, the system may remove images where a particular portion of the images contain clouds or cloud shadows. For example, the system may remove all images where the percentage of pixels containing clouds or cloud shadows is greater than or equal to thirty percent.

By removing images that include clouds or cloud shadows, the system reduces memory usage of storing the images, reduces the number of computations performed, and increases the accuracy of the modeling performed using the remaining images. For example, if the system receives fifty images over a period of time for the purpose of modeling crop yield, the system may first identify twenty of those images as containing more than a threshold percentage of clouds or cloud shadows and remove the identified images. The system may then perform the modeling techniques using the remaining thirty images, thereby decreasing the computational cost of the modeling while increasing the model's accuracy.

6. Agronomic Map Display

In an embodiment, the system utilizes the systems and methods described herein to generate an improved display. For example, the system may identify ideal images of a field for display on a computing device based on the data identifying clouds and cloud shadow locations. As a practical example, the system may request to display a recent image of an agronomic field. The system may identify the most recently generated image of the field that does not contain any cloud or cloud shadow and cause display of the identified image. Additionally or alternatively, the system may identify the most recently generated image of the field that contains less than a threshold percentage of cloud or cloud shadow and cause display of the identified image.

In an embodiment, the system generates an overlay for the image based on the data identifying clouds and cloud shadows in the image. For example, the system may compute an index value, such as an NDVI value, for each location on the field that has not been identified as including a cloud or cloud shadow. The system may then generate an overlay for the image that identifies the NDVI of the locations that do not include cloud or cloud shadow. Thus, if the system receives a request for display of a current image of a field with NDVI values, the system may use the methods described herein to identify cloud and cloud shadow locations and generate an overlay for the remaining locations. The system may then cause display of the image with the overlay on a requesting client computing device.

By generating an overlay that distinguishes between locations with clouds or cloud shadows and locations without, the system is able to provide an improved interface which can display useful data overlaying an image of an agronomic field. Thus, the system may be able to display images from different times in a day or different days without losing information or providing incorrect information due to the existence of a cloud. For example, the agricultural intelligence computer system may receive a request to display an image of an agronomic on a first day at a first time and, in response, display an image with an overlay identifying vegetative index values for locations without clouds or cloud shadows. The system may then receive a second request to display an image of the agronomic field on a second day at a second time and, in response, display an image with a different overlay due to the shifting positions of clouds and cloud shadows. In this manner, the system provides index values for locations where values are calculable in each image, thereby allowing a field manager to gain useful information regarding an agronomic field despite the existence of clouds in multiple images.

7. Benefits of Certain Embodiments

The systems and methods described herein provide a practical application of machine learning to solving a specific problem which arises in using satellite imagery for agronomic purposes. By utilizing a machine learning algorithm, an agricultural intelligence computer system is able to improve the utilization of images for agronomic purposes by identifying clouds or cloud shadows in the images. This allows the agricultural intelligence computer system to practically apply machine learning techniques to solve a problem unique to satellite imagery. Additionally, the methods and techniques described herein allow the agricultural intelligence computer system to generate improved images, improved agronomic models, and improved map displays.

The systems and methods described herein improve the computer's ability to perform complex computations for purposes of agronomic modeling. By removing pixels including clouds and cloud shadows from received images, the system is able to produce accurate computations using a smaller number of images, thereby reducing the number of computations the computer must perform to obtain the same accuracy in results. Additionally, memory of the computer system may be improved by removing from storage images which contain clouds and cloud shadows or images with more a threshold percentage of the image containing cloud or cloud shadows.

What is claimed is:

1. A system comprising:
   one or more processors;
   a memory storing instructions executable by the one or more processors to cause the system to:
   receive a plurality of images of agronomic fields produced using one or more frequency bands;
   receive data identifying cloud locations and cloud shadow locations in the plurality of images;
   train a first machine learning system to identify cloud locations using the plurality of images as inputs and data identifying pixels as cloud pixels or non-cloud pixels as outputs;
   using the data identifying cloud locations, identify a plurality of candidate cloud shadow locations for each of the plurality of images,
   wherein identifying a plurality of candidate cloud locations comprises, for each image of the plurality of images:
      receiving metadata identifying a location of the agronomic field in the image; and
      using the metadata and the data identifying cloud locations, identifying a plurality of possible physical locations of clouds corresponding to the data identifying cloud locations by identifying a first possible physical location of clouds at a predetermined maximum height, identifying a second possible physical location of clouds at a predetermined minimum height, and identifying one or more interim possible physical locations of clouds at one or more heights between the predetermined maximum height and the predetermined minimum height;
   train a second machine learning system to identify cloud shadow locations using the images and the candidate cloud shadow locations as inputs and data identifying pixels as cloud shadow pixels or non-cloud shadow pixels as outputs;
   receive one or more particular images of a particular agronomic field produced using the one or more frequency bands;
   using the one or more particular images as inputs into the first machine learning system, identify a plurality of pixels in the one or more particular images as particular cloud locations;
   using the particular cloud locations, identify a plurality of particular candidate cloud shadow locations;
   using the one or more particular images and the plurality of particular candidate cloud shadow locations as inputs into the second machine learning system, identify a plurality of pixels in the one or more particular images as particular cloud shadow locations.

2. The system of claim 1, wherein the machine learning system is a convolutional encoder-decoder comprising a plurality of convolutional encoding steps interspersed with pooling steps and a plurality of convolutional deciding steps interspersed with upsampling steps.

3. The system of claim 1, wherein the machine learning system is a convolutional encoder-decoder that has been customized to accept inputs of different types using a customized machine learning layer which shapes a build of a vector based on a symbolic shape of an output tensor.

4. The system of claim 1, wherein each input of the inputs used to train the machine learning system comprise a plurality of stacked matrices, each of the plurality of stacked matrices generated from images captured using different frequency bands.

5. The system of claim 1, comprising remove, from the one or more particular images, each pixel of the plurality of pixels which were identified as particular cloud locations or particular cloud shadow locations.

6. The system of claim 5, wherein the instructions, when executed by the one or more processors, further cause performance of:
   receiving one or more second images of the particular agronomic field produced using the one or more frequency bands;
   using the one or more second image as inputs into first machine learning systems, identifying a plurality of pixels in the one or more second images as second cloud locations;
   using the second cloud locations, identifying a plurality of second candidate cloud shadow locations;
   using the one or more second images and the plurality of second candidate cloud shadow locations as inputs into the second machine learning system, identifying a plurality of pixels in the one or more second images as second cloud shadow locations;
   identifying a subset of the plurality of pixels that were identified as particular cloud locations or cloud shadow locations in the one or more particular images which correspond to a plurality of pixels that were not identified as second cloud locations or second cloud shadow locations in the one or more second images;
   replacing removed pixels corresponding to the identified subset of the plurality of pixels that were identified as particular cloud locations or particular cloud shadow locations in the one or more particular images with the plurality of pixels that were not identified as second cloud locations or second cloud shadow locations in the one or more second images.

7. The system of claim 1, wherein the instructions, when executed by the one or more processors, further cause of the system to:
   receive a plurality of second images of the particular agronomic field produced using the one or more frequency bands;
   using the plurality of second images as inputs into the machine learning system, identify a plurality of pixels in the plurality of second images as second cloud locations;
   using the second cloud locations, identify a plurality of second candidate cloud shadow locations;
   using the plurality of second images and the plurality of second candidate cloud shadow locations as inputs into the second machine learning system, identify a plurality of pixels in the plurality of second images as second cloud shadow locations;
   receive a request to display an image of the particular agronomic field;
   determine that the one or more particular images comprise a number of pixels that were identified as particular cloud locations or particular cloud shadow locations that is less than a number of pixels in each of the plurality of second images that were identified as second cloud locations or second cloud shadow locations; and
   in response, cause display of the one or more particular images.

8. A computer-implemented method comprising:
receiving a plurality of images of agronomic fields produced using one or more frequency bands;
receiving data identifying cloud locations and cloud shadow locations in the plurality of images;
training a first machine learning system to identify cloud locations using the images as inputs and data identifying pixels as cloud pixels or non-cloud pixels as outputs;
using the data identifying cloud locations, identifying a plurality of candidate cloud shadow locations for each of the plurality of images;
training a second machine learning system to identify cloud shadow locations using the plurality of images and the candidate cloud shadow locations as inputs and data identifying pixels as cloud shadow pixels or non-cloud shadow pixels as outputs;
receiving one or more particular images of a particular agronomic field produced using the one or more frequency bands;
using the one or more particular images as inputs into the first machine learning system, identifying a plurality of pixels in the one or more particular images as particular cloud locations;
using the particular cloud locations, identifying a plurality of particular candidate cloud shadow locations,
wherein identifying a plurality of candidate cloud locations comprises, for each image of the plurality of images:
    receiving metadata identifying a location of an agronomic field in the image;
    using the metadata and the data identifying cloud locations, identifying a plurality of possible physical locations of clouds corresponding to the data identifying cloud locations by identifying a first possible physical location of clouds at a predetermined maximum height, identifying a second possible physical location of clouds at a predetermined minimum height, and identifying one or more interim possible physical locations of clouds at one or more heights between the predetermined maximum height and the predetermined minimum height; and
using the one or more particular images and the plurality of particular candidate cloud shadow locations as inputs into the second machine learning system, identifying a plurality of pixels in the one or more particular images as particular cloud shadow locations.

9. The computer-implemented method of claim 8, wherein the machine learning system is a convolutional encoder-decoder comprising a plurality of convolutional encoding steps interspersed with pooling steps and a plurality of convolutional deciding steps interspersed with upsampling steps.

10. The computer-implemented method of claim 8, wherein the machine learning system is a convolutional encoder-decoder that has been customized to accept inputs of different types using a customized machine learning layer which shapes a build of a vector based on a symbolic shape of an output tensor.

11. The computer-implemented method of claim 8, wherein each input of the inputs used to train the machine learning system comprise a plurality of stacked matrices, each of the plurality of stacked matrices generated from images captured using different frequency bands.

12. The computer-implemented method of claim 8, further comprising removing, from the one or more particular images, each pixel of the plurality of pixels which were identified as particular cloud locations or particular cloud shadow locations.

13. The computer-implemented method of claim 12, comprising:
receiving one or more second images of the particular agronomic field produced using the one or more frequency bands;
using the one or more second image as inputs into first machine learning systems, identifying a plurality of pixels in the one or more second images as second cloud locations;
using the second cloud locations, identifying a plurality of second candidate cloud shadow locations;
using the one or more second images and the plurality of second candidate cloud shadow locations as inputs into the second machine learning system, identifying a plurality of pixels in the one or more second images as second cloud shadow locations;
identifying a subset of the plurality of pixels that were identified as particular cloud locations or cloud shadow locations in the one or more particular images which correspond to a plurality of pixels that were not identified as second cloud locations or second cloud shadow locations in the one or more second images;
replacing removed pixels corresponding to the identified subset of the plurality of pixels that were identified as particular cloud locations or particular cloud shadow locations in the one or more particular images with the plurality of pixels that were not identified as second cloud locations or second cloud shadow locations in the one or more second images.

14. The computer-implemented method of claim 8, further comprising:
receiving a plurality of second images of the particular agronomic field produced using the one or more frequency bands;
using the plurality of second images as inputs into the machine learning system, identifying a plurality of pixels in the plurality of second images as second cloud locations;
using the second cloud locations, identifying a plurality of second candidate cloud shadow locations;
using the plurality of second images and the plurality of second candidate cloud shadow locations as inputs into the second machine learning system, identifying a plurality of pixels in the plurality of second images as second cloud shadow locations;
receiving a request to display an image of the particular agronomic field;
determining that the one or more particular images comprise a number of pixels that were identified as particular cloud locations or particular cloud shadow locations that is less than a number of pixels in each of the plurality of second images that were identified as second cloud locations or second cloud shadow locations and, in response, causing display of the one or more particular images.

* * * * *